United States Patent [19]

Jane et al.

[11] Patent Number: 5,115,000

[45] Date of Patent: May 19, 1992

[54] BIODEGRADABLE STARCH PLASTICS INCORPORATING MODIFIED POLYETHYLENE

[75] Inventors: Jay-Lin Jane; Alan W. Schwabacher; Sam N. Ramrattan; Jeffrey A. Moore, all of Ames, Iowa

[73] Assignee: Iowa State University Research Foundation, Inc., Ames, Iowa

[21] Appl. No.: 540,583

[22] Filed: Jun. 19, 1990

[51] Int. Cl.$^5$ .................. C08L 3/00; C08L 23/00; C08F 8/00

[52] U.S. Cl. .................. 524/47; 525/191; 525/240; 525/252

[58] Field of Search .......... 524/47; 525/191, 252, 525/240

[56] References Cited

U.S. PATENT DOCUMENTS

| | | | |
|---|---|---|---|
| 2,676,929 | 4/1954 | Duddy | 54/61 |
| 3,952,347 | 4/1976 | Comerford et al. | 5/484 |
| 4,021,388 | 5/1977 | Griffin | 523/128 |
| 4,133,784 | 1/1979 | Otey et al. | 523/128 |
| 4,337,181 | 6/1982 | Otey et al. | 523/128 |
| 4,624,256 | 11/1986 | Messier et al. | 128/335.5 |

FOREIGN PATENT DOCUMENTS

| | | |
|---|---|---|
| 0258154 | 3/1988 | European Pat. Off. |
| 2029836 | 3/1980 | United Kingdom |

*Primary Examiner*—Nathan M. Nutter
*Attorney, Agent, or Firm*—Zarley, McKee, Thomte, Voorhees & Sease

[57] ABSTRACT

A composition is disclosed for a biodegradable, blendable plastic having improved tensile strength. It consists of starch, oxidized polyethylene, and polyethylene. The starch is included in an amount up to 50% by weight, the oxidized polyethylene up to 15% by weight, and the remaining amount is polyethylene. It is preferred that high molecular weight oxidized polyethylene be used and in the method of producing the composition, it is preferred that the blending of the components occur at a temperature range of 110° C. to 200° C.

11 Claims, No Drawings

BIODEGRADABLE STARCH PLASTICS INCORPORATING MODIFIED POLYETHYLENE

BACKGROUND OF THE INVENTION

Plastics have become an integral part of our everyday life, and have been used for a multitude of purposes. They are ordinarily light weight, durable, and easily molded into a variety of forms. However, they have a distinct disadvantage in that plastics are usually not capable of self-decomposition. Thus, a tremendous problem exists with most plastics in their continual accumulation and contribution to the increasing waste problems faced in many countries. The problem of disposal of undecomposible plastics has risen to a point of considerable concern.

Polyethylene is among the most common polymers used in the plastics industry. It has high tensile strength and a high melting point which provides for good blending and easy extrusion into various forms. It is especially useful in making plastic films, which are used in items such as garbage bags. It has the disadvantage of most plastics, however, in not being biodegradable.

Attempts have been made to create plastics which are biodegradable by incorporating starches into polymers. This, however, has contributed its own unique problems. Starch is hydrophilic, while polyethylene is hydrophobic, and so the two are not compatible with one another. Furthermore, when more starch is introduced into a polymer, the resulting plastic film will typically have poor tensile strength.

It would be a considerable advantage to develop a plastic incorporating starch which overcomes the problems of the incompatibility between polyethylene and starch, the loss in tensile strength with the increase in the amount of starch, and still have a product which is easily blended and extruded into the desired form. This invention relates to such an improvement.

Accordingly, it is an object of the invention to provide for a biodegradable plastic having good tensile strength.

Another object of the invention is to provide for a plastic from polyethylene in which the polyethylene is made compatible with starch.

Still another object of the invention is to provide for a plastic which is easily capable of being blended and extruded into a desired form.

Yet another object of the invention is to provide for a plastic which is relatively inexpensive to manufacture.

Still further objects of the invention will become apparent through the following disclosure.

SUMMARY OF THE INVENTION

A blendable, high tensile strength, biodegradable plastic is disclosed which consists of starch, oxidized polyethylene and unmodified polyethylene. The components are blended while heated at a temperature of 110° C. to 200° C. The starch comprises up to 50% of the composition, the oxidized polyethylene comprises up to 15% of the composition, and the remaining amount is the polyethylene. The resulting mixture after heating and blending may be formed into the desired shape, and is especially useful for plastic films.

DETAILED DESCRIPTION OF THE INVENTION

The composition of this invention consists of starchy material, oxidized polyethylene and polyethylene.

The starch which may be used in this invention is preferably a granular starch. Gelatinized starch is not only not necessary, preparation of gelatinized starch is energy consuming, and so granular starch is the preferred component in this invention. Any type of starch may be used, and the term starchy material includes unmodified starches, modified starches, or starch components such as amylose or amylopectin. Native unmodified starches include the cereal grains and root crop starches. There are a variety of modified starches, such as octenyl succinate particle starch for example. However, an advantage of this invention is that native starch may be used and it is not necessary to use modified starch, which is more expensive.

Polyethylene which has been oxidized is the second component of this invention. The manner in which the polyethylene has been oxidized is not critical, and oxidized polyethylene is available commercially. The oxidized polyethylene used in the example below was obtained from the Aldrich Company at 940 West St. Paul Avenue, Milwaukee, Wisconsin 53233. The third component is polyethylene which has not been so modified.

The oxidized polyethylene provides a considerable advantage. As has been noted, since polyethylene is hydrophobic and starch is hydrophilic, the two are usually incompatible. However, with the addition of the oxidized polyethylene, a "bridge" is formed which connects the starch with polyethylene. Oxidized polyethylene has carboxy groups and ketone groups. While not wishing to be bound by any theory, it is the belief of the inventors that the carboxyl groups on the oxidized polyethylene form ester bonds with the hydroxyl groups on the starch to an extent determined by processing. This, along with hydrogen bonding, provides for compatibility between the polyethylene and the starch. This has additionally been associated with improved tensile strength. Finally, a third improvement results because of addition of the oxidized polyethylene. The carboxyl groups on the oxidized polyethylene enables a variety of organisms to degrade the polymer by beta-oxidation, in direct contrast to other carboxyl containing polyethylenes such as ethylene acrylic acid copolymer. Thus, the presence of the oxidized polyethylene further enhances biodegradation of the material, in addition to that already provided by the starch itself.

Oxidized polyethylene is advantageous in that it is not highly acidic and no neutralizer is required. It may be used with granular starch without difficulty. It also is less expensive than other polymers, such as ethylene arcylic acid copolymer.

While providing these advantages, the addition of oxidized polyethylene has several disadvantages. Oxidized polyethylene and starch alone does not provide for the best possible tensile strength. Additionally, oxidized polyethylene has a lower melting point than polyethylene. Because of this low melting point, difficulties are encountered in blending the composition.

One method of overcoming the problems associated with low melting point of the oxidized polyethylene is to provide that the polyethylene which has been oxidized has a high molecular weight. Low molecular weight polyethylene has been defined as that having a molecular weight range from about 2000 to about 5000 grams per mole. High molecular weight polyethylene would have a molecular weight in excess of this. With the higher molecular weight, the melting point increases and blendability improves.

However, even better tensile strength and higher melting point may be achieved by adding polyethylene to the oxidized polyethylene and starch. By virtue of adding unmodified polyethylene, the melting point will increase, and blendability improve. The tensile strength will improve even further. Unmodified polyethylene also has the advantage of being lower in cost than oxidized polyethylene.

Thus, by combining starch, oxidized polyethylene, and unmodified polyethylene, one may produce a blendable, biodegradable plastic having greatly improved tensile strength.

The actual process for the blending of the materials will vary depending upon the mechanism used. The type of device used for the blending is not critical. However, it has been found that among the most popular methods of blending, batch mixing and screw extrusion, that screw extrusion provides more cost effective and time efficient results. In either process, the three components are blended together. Starch may be added into the composition up to 50%. When tensile strength is desired to be the property most emphasized the preferred range of the amount of starch to use is between 6% and 15% by weight. The preferred range may vary when other properties are emphasized. For example, higher amounts of starch are preferred when biodegradability is the property most emphasized. When used in creating a plastic film, the industry typically includes starch in the amount of 6% by weight to 9% by weight. In fact, there is no minimum amount of starch within this range. Inclusion of any amount of starch will improve biodegradability. However, as noted, when the amount of starch exceeds 50%, tensile strength is considerably reduced. This is because the granules disrupt continuity of the polymers and strength drops. Typically, the goal in the industry is to use as much starch as possible without unnecessarily sacrificing tensile strength. With this invention, it is possible to increase the amount of starch while still retaining good tensile strength.

It has been found that the preferred range of inclusion of oxidized polyethylene is between 6% to 15% by weight. When less than 6% is used it is ordinarily too little to serve the purpose; if more than 15% is used problems with blending are often encountered. The ratio of the amount of starch to oxidized polyethylene falls within the range of 1:1 starch to oxidized polyethylene, up to about 3.3:1 starch to oxidized polyethylene. The remaining amounts of the composition consist of the polyethylene.

In a batch mixing process, it has been found that the preferred temperature range for low molecular weight oxidized polyethylene inclusion is between 110° C. to 130° C. When high molecular weight oxidized polyethylene is used in the batch process the temperature range falls within 150° C. to 170° C. The die temperatures on the extruder when compounding are preferably set at 150° C. for low molecular weight oxidized polyethylene, and 165° C. for high molecular weight oxidized polyethylene.

In the preferred screw extruder process, the temperature range for the compound blending ranges between 145° C. to 165° C. Ordinarily, the blending occurs at about 40 rpm. A double screw extrusion mechanism provides even better mixing at this point. The result of the first blending and extrusion is that the compound is formed into a rod shape, and then cut into pellets. In the second step of the process, the pellets are blended and heated at even higher temperatures. The composition is heated to a molten state, and the preferred temperature range at this point is 150° C. to 200° C., with the typical mixing speed at 20 to 26 rpm. Following this, the composition continues to a blowing tower where it is then blown into a film.

These are only two mechanisms for blending and extruding. Other mechanisms are known to those skilled in the art.

The time for heating and blending to occur is not critical to the process and those skilled in the art will recognize that the parameters will vary depending on the mechanisms used. With a screw extruder, for example, one calculates the mixing time by determining the length of the barrel and dividing this by the number of flights to obtain the pitch. The revolutions per minute are multiplied by the pitch to obtain the screw speed. The length of the barrel is divided by the screw speed to obtain the mixing time. For instance, in the example below, barrel length was 31.24 inches, and there were 25 flights yielding a pitch of 1.25 inches. At 15 rpm, the screw speed was 18.75 inches per minute, and the mixing time calculated at 2.14 minutes.

The following example is set forth for illustrative purposes only and is not intended to limit the invention.

EXAMPLE

The following data reflected in the table below results from a blending and heating process using the double screw and single screw extruders as described above.

As can be seen from the table below, four different compositions were tested. In each test, the amount of native starch, to oxidized polyethylene, to polyethylene in the mixture is shown. The compound blending parameters are set forth, including the rpm, and the temperature range used. The first column of the temperature zone readings shows temperatures measured from a probe placed within the feeding zone, the second and third indicate temperature probes in the barrel, while the last shows a temperature probe at the exit point. Extrusion parameters are also set forth, which also include zone temperatures and rpm. These are higher temperatures and a molten state results. As can be seen, it is preferred that the temperature increase as the composition moves toward the exit port in the compound and extrusion steps.

TABLE

| | | COMPOUNDED PARAMETERS | | EXTRUSION PARAMETERS | | S.D. | $\overline{X}$ | S.D. % | $\overline{X}$ % |
|---|---|---|---|---|---|---|---|---|---|
| | | RPM | ZONE TEMP. °C. | RPM | ZONE TEMP. °C. | PSI | PSI | ELONG. | ELONG. |
| TEST 1 | 7% NS/7% OPE/ 86% PE | 40 | 145,155,160,165 | 26 | 150,160,200 | 447 | 2407 | 67.5 | 523.2 |
| TEST 2 | 15% NS/15% OPE/ 70% PE | 40 | 145,155,160,165 | 25 | 150,160,200 | 442 | 2330 | 30.4 | 580.7 |

TABLE-continued

|  |  | COMPOUNDED PARAMETERS | | EXTRUSION PARAMETERS | | S.D. PSI | $\overline{X}$ PSI | S.D. % ELONG | $\overline{X}$ % ELONG. |
|---|---|---|---|---|---|---|---|---|---|
|  |  | RPM | ZONE TEMP. °C. | RPM | ZONE TEMP. °C. |  |  |  |  |
| TEST 3 | 25% NS/15% OPE/ 60% PE | 40 | 150,155,160,165 | 20 | 150,155,160,170,200 | 267 | 1383 | 66.4 | 466.0 |
| TEST 4 | 50% NS/15% OPE/ 35% PE | 40 | 150,155,160,165 | 20 | 150,155,160,170,200 | 160 | 665 | 54.8 | 88.5 |
| CONTROL 1 | PE/7% NCS | 40 | 150,155,160,165 | 20 | 150,155,160,170,200 | 710 | 2193 | 79.0 | 542.9 |
| CONTROL 1 | PE/15% NCS | 40 | 155,160,170,185 | 20 | 150,155,160,170,200 | 616 | 1611 | 111.7 | 242.2 |

Results are shown in the column at the right hand side of the table. The term S.D. PSI refers to the standard deviations in pounds per square inch of measurements obtained; the reference to $\overline{X}$PSI refers to the average PSI obtained from 15 different samples. The next two columns refer to the standard deviations in percent of elongation, and average percent elongation from testing of 15 samples.

These results may be compared with the control also set forth in the table, wherein native starch was mixed with polyethylene alone. As can be seen, improved tensile strength results from the inclusion of all three components.

Therefore it can be seen that the invention accomplishes at least all of its objectives.

What is claimed is:

1. A blended, high tensile strength, biodegradable plastic composition comprising a starchy material, oxidized polyethylene and unmodified polyethylene the ratio of said starchy material to said oxidized polyethylene being within the range of 1:1 up to about 3.3:1.

2. The composition of claim 1 wherein the starchy material is selected from the group consisting of unmodified starch, modified starch, amylose and amylopectin.

3. The composition of claim 1 wherein the starchy material comprises up to 50% by weight of the composition.

4. The composition of claim 3 wherein the starchy material comprises 6% by weight to 15% by weight of the composition.

5. The composition of claim 1 wherein the oxidized polyethylene is a high molecular weight polyethylene.

6. The composition of claim 5 wherein the oxidized polyethylene has a molecular weight of more than 5000 grams per mole.

7. The composition of claim 1 wherein the oxidized polyethylene comprises up to 15% by weight of the composition.

8. The composition of claim 1 wherein the ratio of starchy material to oxidized polyethylene is in the range of 1:1 up to about 3.3:1.

9. The composition of claim 1 wherein the ratio of starchy material to oxidized polyethylene is 1:1.

10. The composition of claim 1 wherein the starchy material is 6% by weight to 15% by weight of the composition, the oxidized polyethylene is 6% by weight to 15% by weight of the composition and the remaining amount of the composition is polyethylene.

11. A blendable high tensile strength composition for biodegradable films comprising:
a granular starchy material;
polyethylene in an amount sufficient to increase tensile strength and blendability; and
oxidized polyethylene in an amount sufficient to improve binding to the starch and tensile strength the ratio of starchy material to oxidized polyethylene being within the range of 1:1 up to about 3.3:1.

* * * * *